United States Patent
Adugna et al.

(10) Patent No.: US 12,434,807 B2
(45) Date of Patent: Oct. 7, 2025

(54) ANTENNA CLADDING FOR AIRCRAFT

(71) Applicant: Lufthansa Technik AG, Hamburg (DE)

(72) Inventors: Tobias Adugna, Norderstedt (DE); Arno Strotmann, Hamburg (DE); Matthias Exner, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 143 days.

(21) Appl. No.: 18/550,691

(22) PCT Filed: Mar. 14, 2022

(86) PCT No.: PCT/EP2022/056431
§ 371 (c)(1),
(2) Date: Sep. 15, 2023

(87) PCT Pub. No.: WO2022/194725
PCT Pub. Date: Sep. 22, 2022

(65) Prior Publication Data
US 2024/0190553 A1    Jun. 13, 2024

(30) Foreign Application Priority Data
Mar. 16, 2021  (DE) .................. 10 2021 106 321

(51) Int. Cl.
*H01Q 1/28*    (2006.01)
*B64C 1/36*    (2006.01)
*H01Q 1/42*    (2006.01)

(52) U.S. Cl.
CPC .............. *B64C 1/36* (2013.01); *H01Q 1/286* (2013.01); *H01Q 1/42* (2013.01)

(58) Field of Classification Search
CPC . H01Q 1/28; H01Q 1/286; H01Q 1/42; B64C 1/36
See application file for complete search history.

(56) References Cited

U.S. PATENT DOCUMENTS

| 2016/0190675 A1 | 6/2016 | Dasanayaka |
| 2017/0373383 A1 | 12/2017 | Baron et al. |

(Continued)

OTHER PUBLICATIONS

APEX Admin; Astronics Unveils AeroShield. A Low Drag Radome and Composite Adapter Plate, Sep. 2015, pp. 1-5, APEX Magazine. https://apex.aero/articles/astronics-unveils-aeroshield-a-low-drag-radome-and-composite-adapter-plate/.

(Continued)

*Primary Examiner* — Daniel Munoz
(74) *Attorney, Agent, or Firm* — Leydig, Voit & Mayer, Ltd.

(57) ABSTRACT

An antenna cladding is for fastening fuselage fittings protruding from an outer skin of the aircraft. The antenna cladding has a carrier for fastening antenna modules thereto; a radome fuselage cladding fastened to the carrier for contact on the outer skin; and a radome cover, which forms a continuous cover and lining for electromagnetic radiation in a predetermined wavelength range with the radome fuselage cladding. The carrier is a fiber composite adapter plate made of fiber having recesses with inserts, which have connection fittings for connection to the fuselage fittings. The connection fittings are arranged between upper and lower faces of the adapter plate and are designed such that the connection fittings do not protrude beyond the upper side of the adapter plate and the fuselage fittings do not protrude into the adapter plate when connected to the connection fittings, but do not project beyond the upper side thereof.

15 Claims, 6 Drawing Sheets

(56) References Cited

U.S. PATENT DOCUMENTS

| | | |
|---|---|---|
| 2019/0023371 A1 | 1/2019 | Zimmerman |
| 2019/0305408 A1* | 10/2019 | Chao ...................... H01Q 1/286 |
| 2019/0337604 A1 | 11/2019 | Zimmerman |
| 2019/0341679 A1* | 11/2019 | Ozdemir ................ H01Q 1/287 |
| 2020/0058991 A1* | 2/2020 | Adugna .................. H01Q 1/28 |

OTHER PUBLICATIONS

AEEC, Arinc Characteristic 791P1-3, Mark I Aviation KU-Band and KA-Band Satellite Communication System Part 1. Physical Installation and Aircraft Interfaces, Sep. 2019, pp. 1-253, SAE ITC, Maryland USA.

AEEC, Arinc Characteristic 792, Second-Generation KU-Band and KA-Band Satellite Communication System, Dec. 2018, pp. 1-147, SAE ITC, Maryland USA.

DIN 172, Collar Drill Bushings, Nov. 1992, pp. 1-3, Standards Committee for Tools and grips (FWS) in the DIN German Institute of Standardization e. V., Beuth, Berlin, Germany.

* cited by examiner

ANTENNA CLADDING FOR AIRCRAFT

CROSS REFERENCE TO RELATED APPLICATIONS

This application is a U.S. National Phase application under 35 U.S.C. § 371 of International Application No. PCT/EP2022/056431, filed on Mar. 14, 2022, and claims benefit to German Patent Application No. DE 10 2021 106 321.3, filed on Mar. 16, 2021. The International Application was published in German on Sep. 22, 2022 as WO 2022/194725 A1 under PCT Article 21(2).

FIELD

The present disclosure relates to an antenna cladding for aircrafts, in particular commercial aircrafts.

BACKGROUND

For communication purposes, commercial aircraft regularly have antennas arranged on the upper side of the fuselage, with which a connection to communication satellites located in orbit can be established as relay stations, via which any communication applications, such as, for example, telephony, internet access, or television reception can be realized. To ensure that corresponding communication is reliably possible, the antennas, which are often designed as transceivers for the Ka and/or Ku band, are arranged on the outside of the fuselage.

In order to protect the sensitive antennas from external influences, but also to impair the aerodynamics of the aircraft as little as possible, flow-optimized antenna covers are also known, which are designed, at least in the areas where electromagnetic radiation passes from and to the antennas, as a radome that is transparent to radio waves or has only a slight attenuation.

In the prior art, it is established and, among other things, also specified by industry standards such as, for example, the standards ARINC 791 and ARINC 792 issued by the Airline Electronic Engineering Committee (AEEC) that only a few fittings need to be provided for fastening communication antennas to the outside of an aircraft fuselage. As a result, the integrity of the aircraft structure is little affected and, in particular, the retrofitting of corresponding antennas is also possible. A support structure on which the actual antennas are mounted is then fastened to these fittings. In addition, an aerodynamically optimized radome cover is attached to the support structure, which is sealed with the aircraft fuselage and protects the antennas mounted on the support structure against external influences. In this case, the radome cover is generally not dimensionally stable, but rather retains its intended shape only when it is connected to the support structure at sufficiently narrow distances over its entire circumference. The support structure therefore does not have to carry only the antenna modules, but at the same time also absorb the loads occurring in connection with the retention of the shape of the radome.

The support structure of well-known "classic" antenna cladding for attachment to the top of an aircraft fuselage is usually made of aluminum, often milled from solid material into a lattice structure for reasons of lightweight construction. Various connection points are provided on the top of the support structure for mounting different antenna modules. Fittings are attached to the underside with which the support structure can be attached to the aircraft-side fittings.

Due to the arrangement of the fittings on the underside of the support structure, corresponding classical antenna claddings project far beyond the outer skin of the aircraft, to which they are attached, there is also a risk of bird strikes on the top of the fuselage when flying through lower layers of air or during take-off and landing. Classical antenna claddings are therefore to be checked for bird strike and designed correspondingly stable, which regularly means a high weight.

Furthermore, antenna claddings are known from the prior art, in which the fittings are arranged for connecting to aircraft-side fittings on the upper side of the support structure, so that the aircraft-side fittings are guided through the support structure for fastening. The support structure is then closer to the outside of the aircraft fuselage, whereby antenna claddings formed in this way protrude significantly less far beyond the outer skin of the aircraft than, for example, the classical antenna claddings. In some cases, the height of such antenna claddings is so low that a bird strike is practically impossible, so that, if there is suitable evidence that a direct impact of a bird is extremely unlikely, the obligation to provide evidence of structural integrity for such a scenario is regularly waived.

However, corresponding antenna claddings are hardly flexible with regard to antenna modules that can be mounted on them due to the fittings protruding on the top of the support structure. As a result, corresponding antenna claddings are each designed only to certain antenna modules. A later replacement of an antenna module is therefore not always possible and possibly requires a completely new antenna cladding.

SUMMARY

In an embodiment, the present disclosure provides an antenna cladding that is for an aircraft and configured for fastening fuselage fittings protruding from an outer skin of the aircraft. The antenna cladding has a carrier configured for fastening antenna modules thereto; a radome fuselage cladding fastened to the carrier for contact on the outer skin of the aircraft; and a radome cover, which forms a continuous cover and forms a continuous lining for electromagnetic radiation in a predetermined wavelength range with the radome fuselage cladding. The carrier is an adapter plate made of fiber composite, which has recesses provided with inserts. There are connection fittings formed in the inserts for connection to the fuselage fittings. The connection fittings are arranged between upper and lower faces of the adapter plate and are designed in such a way that the connection fittings do not protrude beyond the upper side of the adapter plate and the fuselage fittings do not protrude into the adapter plate when connected to the connection fittings, but do not project beyond the upper side thereof.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
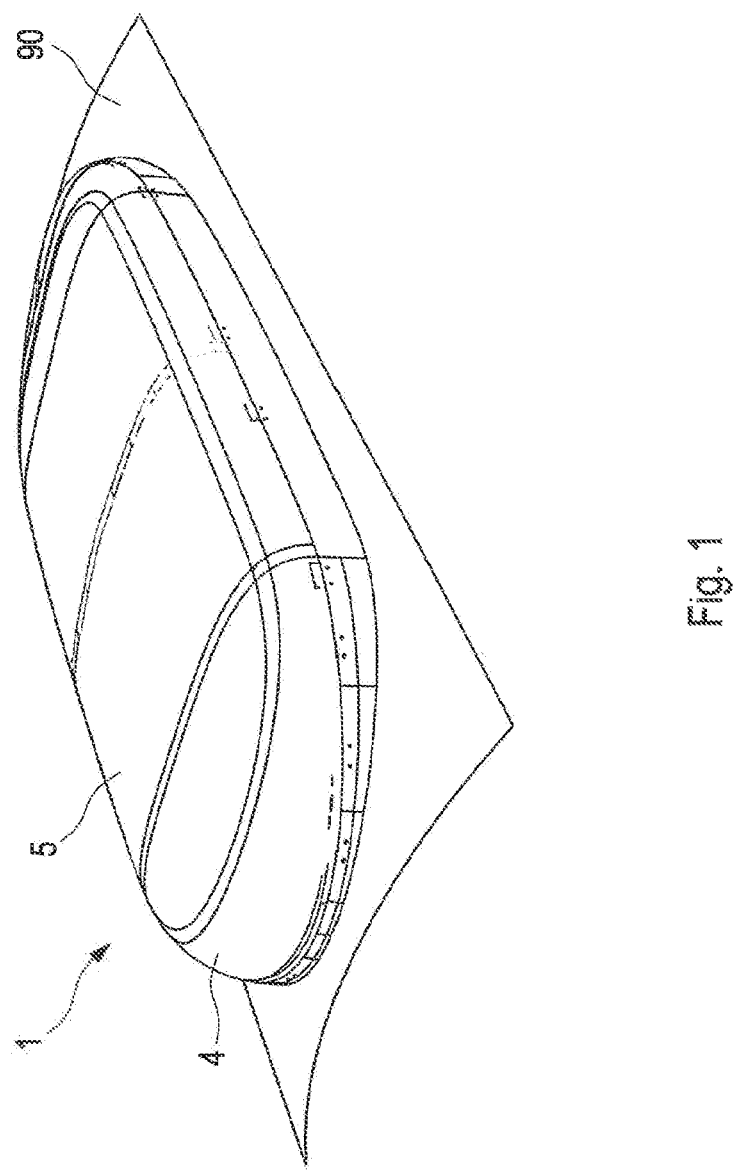
FIG. 1 shows an exemplary embodiment of an antenna cladding for aircraft according to the present disclosure.

In an embodiment, the present disclosure provides an antenna cladding for aircraft, in particular commercial aircraft, in which the disadvantages known from the prior art no longer occur or only occur to a reduced extent.

Accordingly, the present disclosure relates to an antenna cladding for aircraft, in particular for commercial aircraft, for fastening to fuselage fittings protruding from the outer skin of an aircraft, comprising a carrier element for fastening antenna modules, a radome fuselage cladding attached to the carrier element for contact with the outer skin of the aircraft and a radome cover which forms a continuous cladding with the radome fuselage cladding and is transparent to electromagnetic radiation in a predetermined wavelength range, wherein the carrier element is an adapter plate made of fiber composite, which has recesses provided with inserts, connecting fittings designed for connection to the fuselage fittings being provided in the inserts, which are arranged between the top and bottom of the adapter plate and are designed such that the connecting fittings do not protrude beyond the top of the adapter plate and the fuselage fittings protrude into the adapter plate when connected to the connecting fittings, but do not protrude beyond the top of the adapter plate.

First, some terms used in connection with the present disclosure are explained.

A fitting is said to "protrude" into a panel if the fitting penetrates the plane of one of the two sides of the panel. It is "not protruding beyond a side" if the fitting protruding into the panel does not penetrate the plane formed by the side in question. For the present disclosure, this means that the fitting penetrates the plane predetermined by the underside of the adapter plate, but not the plane which is predetermined by its upper side.

A component is "independently dimensionally stable" when it practically does not deform due to its own weight when the component is raised at any singular point. A corresponding component thus maintains its shape regardless of its attachment, so that only weight forces and other forces that may be external to the component have to be diverted via the attachment, but no permanent loads occur that are necessary to maintain the shape of the component.

The present disclosure recognizes that, as a result of the design of the carrier element as an adapter plate made of fiber composite, an antenna cladding is made possible, which enables a significantly lower height than a classic antenna cladding (in the case of identical antenna modules) and at the same time offers greater flexibility with regard to the antenna modules to be used than the antenna claddings which are optimized in respect of the height from the prior art.

The lower overall height compared to classic antenna cladding is achieved by the fuselage fittings protruding from the outer skin of an aircraft being inserted into the adapter plate, whereby the distance between the outer skin of an aircraft or the upper side of the adapter plate can be reduced compared to a fastening on the underside of the adapter plate. The creation of the recesses required for this in the fiber composite adapter plate is possible without problems, wherein it has been shown that the recesses can be arranged easily at different points of the adapter plate, so that an adapter plate can be adapted in principle flexibly to an already existing arrangement of fuselage fittings during its production.

The provision of inserts in recesses in fiber composite plates is likewise known in principle. By means of corresponding inserts, the fiber composite plate at the edge of the recess is protected from damage by components arranged in the recess. A corresponding insert generally has a continuous wall for covering the flanks of the recess and a collar or a flange with which the insert (comparable to a collar drill bush according to DIN 172) rests against one side of the plate and is thus positioned in the recess. The inserts can furthermore be designed as desired for connecting further components, as in the present case the connection fittings.

In the present case, connection fittings for connecting to the fuselage fittings are provided in the inserts. With the help of these connection fittings, the actual connection to the fuselage fittings is carried out, wherein the design of the connection fittings is significantly predetermined by the fuselage fittings. Regardless of the final design of the connection between a connection fitting and a fuselage fitting, the connection fittings are, however, designed such that, in the state inserted in the adapter plate in an insert, they are arranged between the top and bottom of the adapter plate and do not protrude above the top. Preferably, the connection fittings also do not protrude beyond the underside.

Furthermore, the connecting fittings must be designed in such a way that the fuselage fittings protrude into the adapter plate when connected to the connecting fittings, as described, which is inevitable due to the internal connecting elements, but at the same time do not protrude beyond the top of the adapter plate. Investigations have shown that a corresponding design of the connection fittings is readily possible for a large part of known fuselage fittings, in particular those according to the standards ARINC 791 or 792. However, antenna cladding that attaches to fuselage fittings for which connecting elements that meet all of the specifications according to the present disclosure cannot be created cannot be designed according to the present disclosure.

Due to the arrangement and design of the connecting elements according to the present disclosure, the top side of the adapter plate can basically be designed to be free of elements protruding therefrom, which enables a largely flexible arrangement of antenna modules on the adapter plate. Because the carrier element is designed as an adapter plate, it is also possible to provide attachment points for antenna modules at any location on the adapter plate, which also means increased flexibility with regard to the antenna modules used compared to grid-like support elements made of aluminum with fixed attachment points. In the case of a corresponding check of the load-bearing capacity of the adapter plate, it is even possible to subsequently introduce fastening points into an adapter plate already in use in order to also be able to mount antenna modules for which no suitable fastening points were still provided during the initial production of the adapter plate.

In a preferred embodiment, at least one connecting fitting has at least one degree of freedom relative to the respectively assigned fuselage fitting in the plane of the adapter plate. The at least one degree of freedom can preferably be defined in a defined manner and/or can optionally be fixed. By means of a, preferably two, corresponding degrees of freedom, relative movements of the fuselage fittings relative to the adapter plate in the direction of the degrees of freedom and within the scope of the preferably provided limitation of the degrees of freedom can be rendered possible, whereby due to virtually inevitable deformations of the outer shell of an aircraft with a pressure booth during flight, the individual fuselage fittings can be compensated for in a manner free of stress relative to one another. If a connecting fitting can also be moved during assembly in one or more degrees of freedom beyond the restrictions that may otherwise be provided, any tolerances in the arrangement of the fuselage fittings can also be compensated for. After the connection to the fuselage fittings, the degrees of freedom of the connection fittings can be suitably fixed, so that the degree of freedom, as explained above, is limited in a defined manner.

In a preferred embodiment, at least one connection fitting is designed for fastening a bolt which is guided through the associated fuselage fitting on both sides, wherein the fastening on both sides preferably has a degree of freedom in a direction perpendicular to a bolt fixed thereto in the plane of the adapter plate. With sufficient distance between the mounting on both sides, a first degree of freedom in the direction of the bolt guided through the associated fuselage fitting can be achieved, which is defined by the distance in question. If this bolt is further mounted displaceably in a direction perpendicular to its longitudinal axis, a second degree of freedom is provided, which can be defined by corresponding stops and/or the insert in which the connecting element is arranged.

In particular in the case of such an embodiment of a connection fitting, it is advantageous if the recess and/or the free space of an insert provided for receiving a connecting element is rectangular.

In a preferred embodiment, the radome fuselage cladding to be dome-shaped at two opposite ends and to be designed to be sufficiently curved in the regions lying in between that the radome fuselage cladding is independently dimensionally stable. By means of a corresponding configuration of the radome fuselage cladding, the loads acting on the carrier plate are reduced, since in particular the loads known from known antenna claddings are basically omitted for obtaining the shape of the cover.

In the case of an independently dimensionally stable radome fuselage cladding, it is sufficient and preferred if these are fastened to the adapter plate with angle elements, wherein the one leg of an angle element is connected to the radome fuselage cladding and the other leg is connected to the adapter plate.

The individual angle elements can thereby be adaptable to compensate for manufacturing and/or assembly tolerances. For this purpose, suitable angle elements can be selected from a set of differently designed angle elements for each Position at which an angle element is to be provided. Alternatively, it is possible to design the individual angle elements in a variable manner during assembly, for example by virtue of bolt leadthrough openings being produced only during assembly. The angle elements can thus be individually adapted to their respective position.

The actual radome fuselage cladding is fastened to the independently dimensionally stable radome fuselage cladding. In contrast to the radome fuselage cladding, this is absolutely permeable to electromagnetic radiation in a wavelength range that is ultimately predetermined by the antenna modules used, and together with the radome fuselage cladding forms the continuous lining for the antenna modules. In other words, the radome fuselage cladding has an opening which is closed by the radome cover. In this case, the radome cover can also be designed in multiple parts, for example for closing a plurality of openings separated from one another in the radome fuselage cladding.

Unlike the radome fuselage cladding, the radome cover does not have to be inherently dimensionally stable, which enables a small wall thickness that is advantageous for the permeability of electromagnetic radiation. In this case, the shaping of the radome cover is achieved by a suitable connection to the radome fuselage cladding.

With a small wall thickness, however, there is the risk that the radome cover begins to oscillate or inflates during flight. In order to reduce this risk, one or more stiffening elements which support the radome cover can be arranged on the adapter plate. Depending on the design of one or more stiffening elements, for example as a reinforcing rib, the adapter plate itself can also be stiffened. The stiffening elements are preferably detachably connected to the adapter plate in order not to impair the flexibility with regard to the antenna modules that can be used. After selection of the antenna module or modules to be ultimately used, the at least one stiffening element can be connected to the adapter plate in a detachable or cohesive manner at free locations of the adapter plate.

The antenna cladding according to the present disclosure can have a length of 2.5 to 3.0 m, preferably 2.7 to 2.9 m, more preferably 2.8 m and/or a width of 0.7 to 1.5 m, preferably 0.9 to 1.3 m, more preferably 1.1 m. The height of the antenna cladding (starting from the outer skin of the aircraft on which it is arranged) can be less than 30 cm, preferably less than 25 cm, more preferably less than 22 cm. These low heights can be achieved by the embodiment of the antenna cladding according to the present disclosure and thereby reduce the risk of bird strikes in such a way or close the same in practice that evidence for stopping a bird strike is regularly not required. At the same time, they allow the installation of a wide variety of antenna modules.

The position of the recess and/or the configuration of the connection fittings is preferably such that the adapter plate is suitable for connecting to fuselage fittings according to one of the standards ARINC 791 or ARINC 792.

The adapter plate is, in a preferred embodiment, a fiber composite plate in a sandwich construction, preferably with carbon fiber epoxy layers and/or a foam core. Of course, variants with a thermoplastic and/or honeycomb core are also possible. The inserts and/or angle elements are preferably secured securely to the adapter plate from corrosion-resistant stainless steel or aluminum and/or by bolts.

Figure 2:
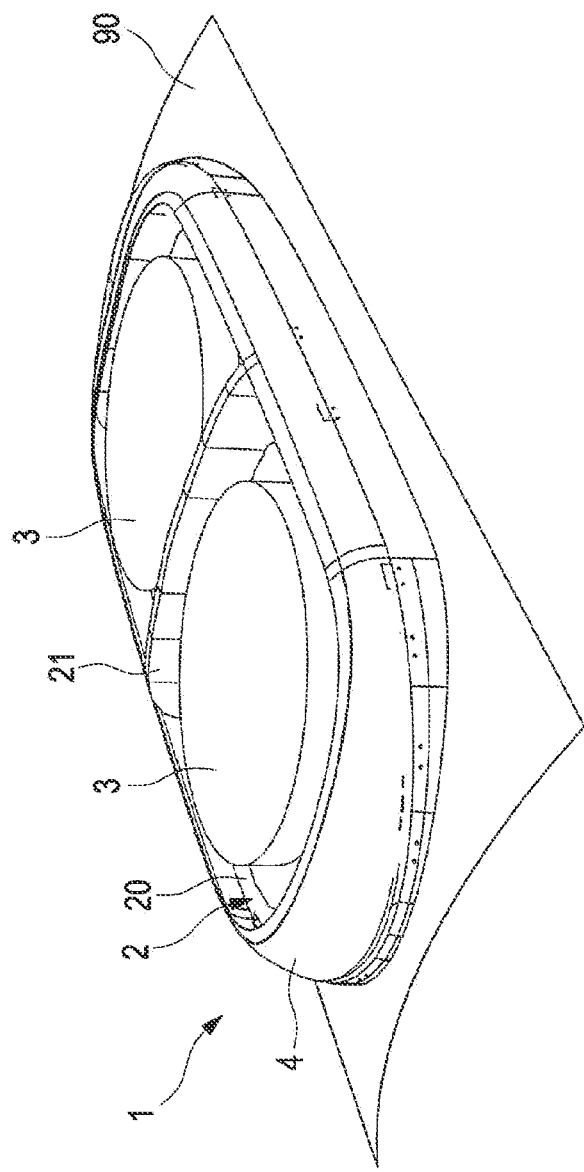
FIG. 2 shows the antenna cladding from FIG. 1 with the radome cover.
Figure 3:
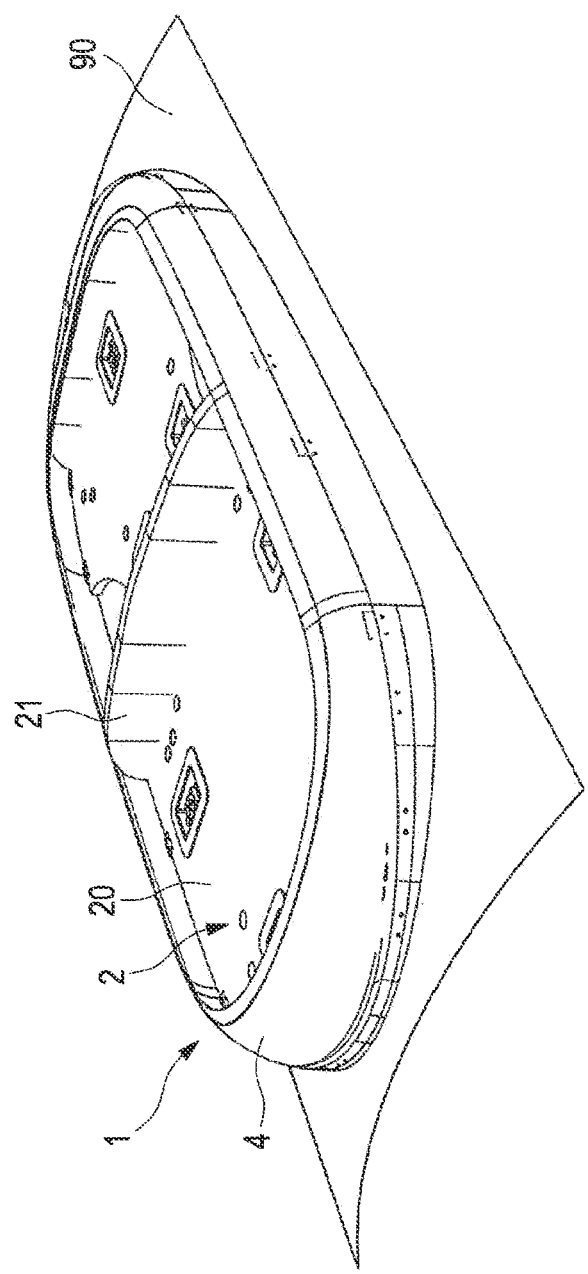
FIG. 3 shows the antenna cladding from FIG. 2 with remote antenna modules.

FIGS. 1 to 3 each show an antenna cladding 1 for aircrafts, wherein, starting from FIG. 1, individual components of the antenna cladding 1 or other components are omitted in the following figures in order to show the components underneath.

The antenna cladding 1 is attached to the outer skin 90 of an aircraft fuselage of a commercial aircraft, as indicated in FIGS. 1 to 3. For this purpose, fuselage fittings according to the standard ARINC 791 are provided on the outer skin 90.

The antenna cladding 1 comprises a carrier element (also referred to as, simply, a carrier) 2 for fastening antenna modules 3 thereto, a radome fuselage cladding 4 fastened to the carrier element 2 for contact on the outer skin 90 of the aircraft, and a radome cover 5 which forms a continuous lining with the radome fuselage cladding 4 and which is transmissive to electromagnetic radiation in a predetermined wavelength range.

Figure 4:
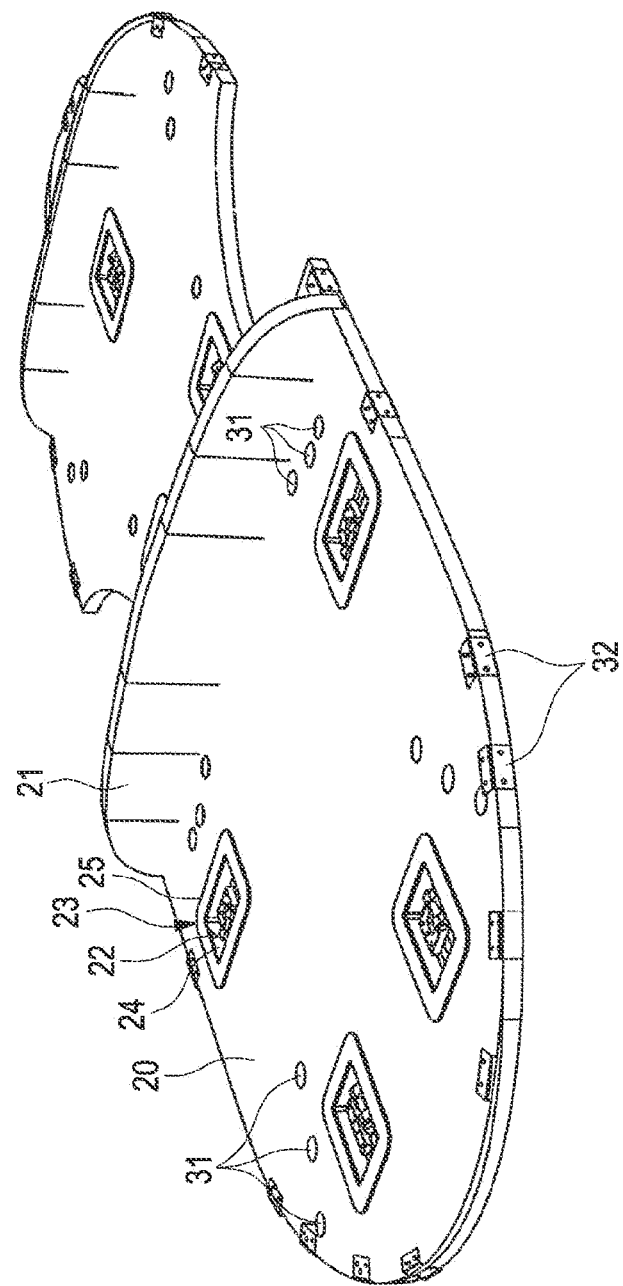
FIG. 4 shows the adapter plate of the antenna cladding according to the preceding figures.

The carrier element 2 of the antenna cladding is an adapter plate 20 made of fiber composite material in a sandwich construction, wherein the cover layers consist of a carbon fiber epoxy material between which a foam core is arranged. A reinforcing element 21 designed as a reinforcing rib is arranged on the upper side of the adapter plate 20 and is bonded to the latter. The adapter plate 20 is shown isolated in detail in FIG. 4.

Essentially rectangular recesses 22 are provided in the adapter plate 20 at the positions at which a connection is provided to a fuselage fitting arranged on the aircraft in accordance with the A-RINC 791 standard, which are also provided with essentially rectangular inserts 23 made of corrosion-resistant stainless steel. The inserts 23 each have a wall 24 which completely covers the edge surface of the recess 22 and has a circumferential collar 25, which rests on the upper side of the adapter plate 20, whereby the inserts 23 only barely rise over the upper side of the adapter plate 20. The inserts 23 can be firmly bonded to the adapter plate 20 by material bonding or else by bolt connections (not shown).

Figure 5:
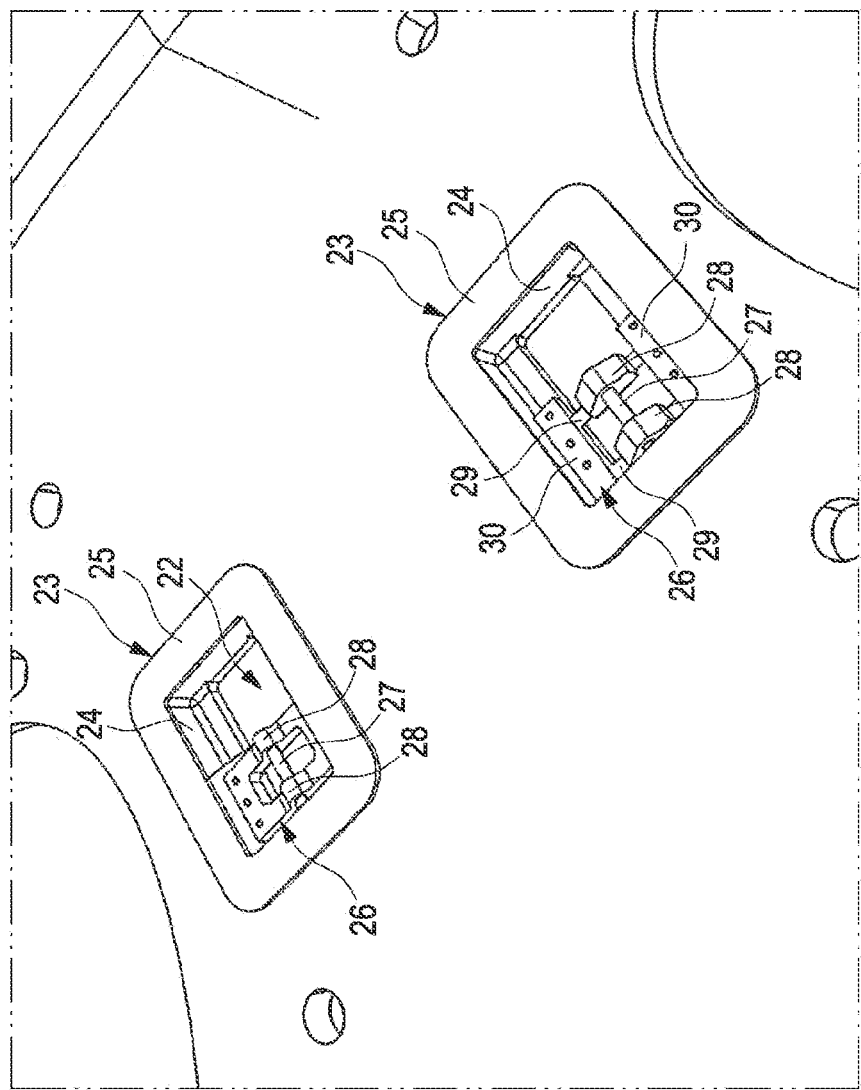
FIG. 5 shows a detail view of FIG. 4.
Figure 6:
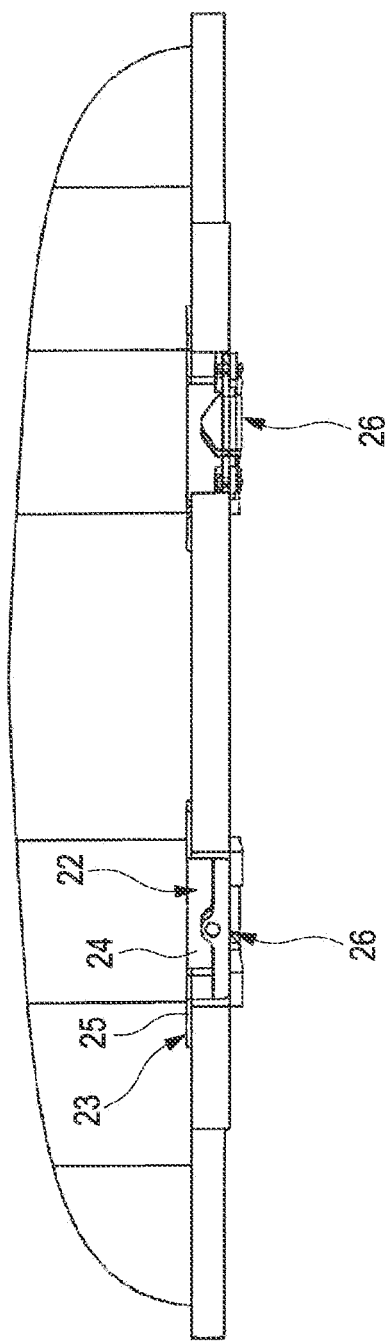
FIG. 6 shows a sectional view of FIG. 4.

In the inserts 23, connection fittings 26 made of corrosion-resistant stainless steel are provided for connecting to fuselage fittings according to the standard ARINC 791, which are shown in greater detail in FIG. 5 and in FIG. 6 in a sectional view parallel to the reinforcing element 21 through the connection fittings 26 shown in FIG. 5.

The connection fittings 26 each comprise a bolt 27 which is fastened on both sides in the mounted state and is also guided during assembly by the opening provided for this purpose in a fuselage fitting according to the standard ARINC 791, for which purpose the bolt 27 can be temporarily released. The two fastenings 28 for the bolt 27 have such a distance that the ARINC-791-compliant fuselage fitting through which the bolt 27 is guided can move in the direction of the bolt 27, resulting in a degree of freedom in the plane of the adapter plate 20 defined by the distance between the two attachments 28.

Furthermore, the connection fittings 26 can each be displaced as a whole within the respective insert 23 in the direction of the specified degree of freedom and fix in a desired Position, for example by screwing, relative to the insert 23. A connection fitting 26 can thus be adapted during assembly in its position along the mentioned degree of freedom to the actual position of the fuselage fitting with which it is to be connected, in order to compensate for any manufacturing tolerances. After the fixing of the connection fitting 26, this degree of freedom is again limited by the distance between the two fastenings 28.

In a part of the connection fittings 26, the fastenings 28 for the bolt 27 are mounted displaceably on sliding rails 29 in a direction perpendicular to the bolt 27, which in turn can be fastened by suitable elements 30 on an insert 23 in any position in the direction of the bolt 27. This results in a second, defined degree of freedom in the plane of the adapter plate 20 for connection to a fuselage fitting.

As it can be seen in the sectional view according to FIG. 6, the connection fittings 26 do not project beyond the upper side of the adapter plate 20. In particular, the bolts 27 of the connection fittings 26 are also arranged in such a way that ARINC-791-compliant fuselage fittings do not protrude beyond the upper side of the adapter plate 20 when the connection is complete.

At least the left of the two connection fittings 26 shown in section in FIG. 6 also does not protrude beyond the underside of the adapter plate 20. Only the insert 23 protrudes slightly from the underside of the adapter plate with its area intended for attaching the connecting fitting 26 to it.

Furthermore, a plurality of fastening openings 31, on which different antenna modules 3 of different design and size can be fastened, are provided in the adapter plate 20. Due to the configuration of the carrier element 2 as an adapter plate 20, it is even possible in principle to insert further fastening openings 31 into the adapter plate 20 even at a later point in time, in order to also mount antenna modules 3 which cannot be fastened to already existing fastening openings 31.

Around the edge of the adapter plate 20, angle elements 32 made of corrosion-resistant stainless steel are arranged in designated through holes for fastening the radome fuselage cladding 4 to it. The angle elements 32 are each individually selected from a set of angle elements of different dimensions and configured with respect to their holes in order to thus be able to compensate for manufacturing tolerances of the adapter plate 20 and/or of the radome fuselage cladding 4.

The radome fuselage cladding 4, which is shown in FIG. 3 in the state connected to the adapter plate 20, is intrinsically dimensionally stable. For this purpose, it is dome-shaped on its opposite short sides and in the areas in between.

The radome fuselage cladding 4 has an opening which, after the assembly of the antenna modules 3, can be closed by the radome cover 5, so that a continuous lining, as shown in FIG. 1, results. The radome cover 5 is not inherently dimensionally stable, but retains its shape due to the correspondingly designed connection to the radome fuselage cladding 4. In order to avoid or at least greatly reduce aeroelastic swinging or flutter of the radome cover 5, the stiffening element 21 fastened to the adapter plate 20 is designed to support the radome cover 5.

The radome cover 5 is made of a material that is well permeable to the wavelengths of the electromagnetic radiation originating from the antenna modules 3 or is well permeable to the electromagnetic radiation. In the embodiment shown, the radome cover 5 can moreover have a small thickness, which is conducive to low damping.

The antenna cladding shown has a length of 2,815 mm and a width of 1,160 mm. The maximum height above the outer skin 90 of the aircraft fuselage is 216 mm. Thus, in the case of an arrangement of the antenna cladding 1 on the upper side of the fuselage of a commercial aircraft, the risk of a bird strike is practically equal to zero, for which reason no corresponding detection has to be carried out for the antenna cladding 1 and bird strike does not have to be taken into account in the design of the antenna cladding 1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An antenna cladding configured for an aircraft and configured for fastening fuselage fittings protruding from an outer skin of the aircraft, the antenna cladding comprising:
   a carrier configured for fastening antenna modules thereto;
   a radome fuselage cladding fastened to the carrier for contact on the outer skin of the aircraft; and
   a radome cover, which forms a continuous cover and forms a continuous lining for electromagnetic radiation in a predetermined wavelength range with the radome fuselage cladding,
   wherein the carrier is an adapter plate made of fiber composite, which has recesses provided with inserts,
   wherein there are connection fittings formed in the inserts for connection to the fuselage fittings,
   wherein the connection fittings are arranged between upper and lower faces of the adapter plate and are designed in such a way that the connection fittings do not protrude beyond the upper side of the adapter plate and the fuselage fittings do protrude into the adapter plate when connected to the connection fittings, but do not protrude beyond the upper side thereof.

2. The antenna cladding according to claim 1,
   wherein at least one of the connection fittings has at least one degree of freedom relative to a respectively associated one of the fuselage fittings in a plane of the adapter plate, and
   wherein the at least one degree of freedom is predefined or selectively fixed.

3. The antenna cladding according to claim 1,
   wherein at least one connection fitting is designed to fasten a bolt, which is guided through the associated fuselage fitting on both sides, and
   wherein the fastening on both sides has a degree of freedom in a direction perpendicular to a bolt fixed thereto in a plane of the adapter plate.

4. The antenna cladding according to claim 1,
   wherein at least one of the recesses or a free space of one of the inserts provided for receiving a connector is rectangular.

5. The antenna cladding according to claim 1,
   wherein the radome fuselage cladding is dome-shaped at two opposite ends and is designed to be curved in regions lying in between the two opposite ends, and
   wherein the radome fuselage cladding is independently dimensionally stable.

6. The antenna cladding according to claim 5,
   wherein the radome fuselage cladding is fastened to the adapter plate with angle elements, one leg of an angle element, of the angle elements, being connected to the radome fuselage cladding and another leg of the angle element being connected to the adapter plate.

7. The antenna cladding according to claim 6,
   wherein in order to compensate for manufacturing or assembly tolerances, the individual angle elements are each selected in a suitable manner from a set of differently configured angle elements or are variably adaptable during assembly.

8. The antenna cladding according to claim 7,
   wherein the individual angle elements are each variably adaptable during assembly by means of bolt lead-through openings produced only during the assembly.

9. The antenna cladding according to claim 1,
   wherein one or more stiffening elements, which stiffen the adapter plate and/or support the radome cover, is arranged on the adapter plate.

10. The antenna cladding according to claim 1,
    wherein the antenna cladding has a length of 2.5 to 3.0 m, or a width of 0.7 to 1.5 m, or a height of less than 30 cm.

11. The antenna cladding according to claim 1,
    wherein positions of the recesses or a configuration of the connection fittings is selected such that the adapter plate is fastenable to fuselage fittings according to one of ARINC 791 or ARINC 792 standards.

12. The antenna cladding according to claim 1,
    wherein the adapter plate is a fiber composite plate in a sandwich construction, with carbon fiber epoxy layers and a foam core.

13. The antenna cladding according to claim 1,
    wherein the inserts, the connection fittings, or the angle elements are made of corrosion-resistant stainless steel or by bolts that are attached to the adapter plate.

14. The antenna cladding according to claim 1,
    wherein the antenna cladding has a length of 2.8 m, a width of 1.1 m, and a height of less than 22 cm.

15. An antenna cladding configured for an aircraft and configured for fastening fuselage fittings protruding from an outer skin of the aircraft, the antenna cladding comprising:
    a carrier configured for fastening antenna modules thereto;
    a radome fuselage cladding fastened to the carrier for contact on the outer skin of the aircraft; and
    a radome cover, which forms a continuous cover and forms a continuous lining for electromagnetic radiation in a predetermined wavelength range with the radome fuselage cladding,
    wherein the carrier is an adapter plate made of fiber composite, which has recesses provided with inserts,
    wherein there are connection fittings formed in the inserts for connection to the fuselage fittings,
    wherein the connection fittings are arranged between upper and lower faces of the adapter plate and are designed in such a way that the connection fittings do not protrude beyond the upper side of the adapter plate and the fuselage fittings do protrude into the adapter plate when connected to the connection fittings, but do not protrude beyond the upper side thereof,
    wherein the radome fuselage cladding is dome-shaped at two opposite ends and is designed to be curved in regions lying in between the two opposite ends,
    wherein the radome fuselage cladding is independently dimensionally stable, and
    wherein the radome fuselage cladding is fastened to the adapter plate with angle elements, one leg of an angle element, of the angle elements, being connected to the radome fuselage cladding and another leg of the angle element being connected to the adapter plate.

* * * * *